United States Patent [19]

Starnes

[11] Patent Number: 4,493,978
[45] Date of Patent: Jan. 15, 1985

[54] SERVING DISH WITH HEATING MEANS

[76] Inventor: Roger A. Starnes, 10230 Belladrum Dr., Alpharetta, Ga. 30201

[21] Appl. No.: 512,550

[22] Filed: Jul. 11, 1983

[51] Int. Cl.³ ............................................. F27D 11/02
[52] U.S. Cl. ...................................... 219/438; 99/359; 219/386; 219/432; 219/435; 219/521
[58] Field of Search ............... 219/385, 386, 387, 430, 219/432, 433, 435, 438, 439, 441, 464, 521, 530; 99/359

[56] References Cited

U.S. PATENT DOCUMENTS

| | | | |
|---|---|---|---|
| 3,025,383 | 3/1962 | Forsness, Jr. .................... | 219/432 X |
| 3,043,569 | 7/1962 | Armentrout ..................... | 219/432 X |
| 3,590,727 | 7/1971 | Shelvin ................................. | 99/359 |
| 3,784,787 | 1/1974 | Shelvin ............................... | 219/386 |
| 3,830,148 | 8/1974 | Shelvin ............................... | 99/359 |
| 3,869,596 | 3/1975 | Hovie ................................. | 219/438 |
| 3,924,100 | 12/1975 | Mack et al. ........................ | 219/386 |
| 4,341,949 | 7/1982 | Steiner et al. .................... | 219/439 X |

Primary Examiner—Volodymyr Y. Mayewsky
Attorney, Agent, or Firm—James B. Middleton

[57] ABSTRACT

A serving dish having a heater, and a method for assembling the dish. An electric heater including a resistance element enclosed in a heat conducting and electrical insulating material is adhesively bonded against the bottom of a serving dish of ceramic or the like. Holes through the material covering the resistance element provide for electrical contact with the resistance element, and these holes are filled with solder. A bottom plate of stainless steel or other electrically conductive sheet is adhesively bonded over the heater, and the bottom plate is heated to melt the solder and cause the solder to fuse to the bottom plate. The entire bottom plate has its edges sealed by a silicone rubber sealant or the like to encapsulate the heater. The resulting dish has a bottom plate to give a neat appearance, the bottom acting as electrical contacts to energize the heater and heat the contents of the serving dish.

3 Claims, 7 Drawing Figures

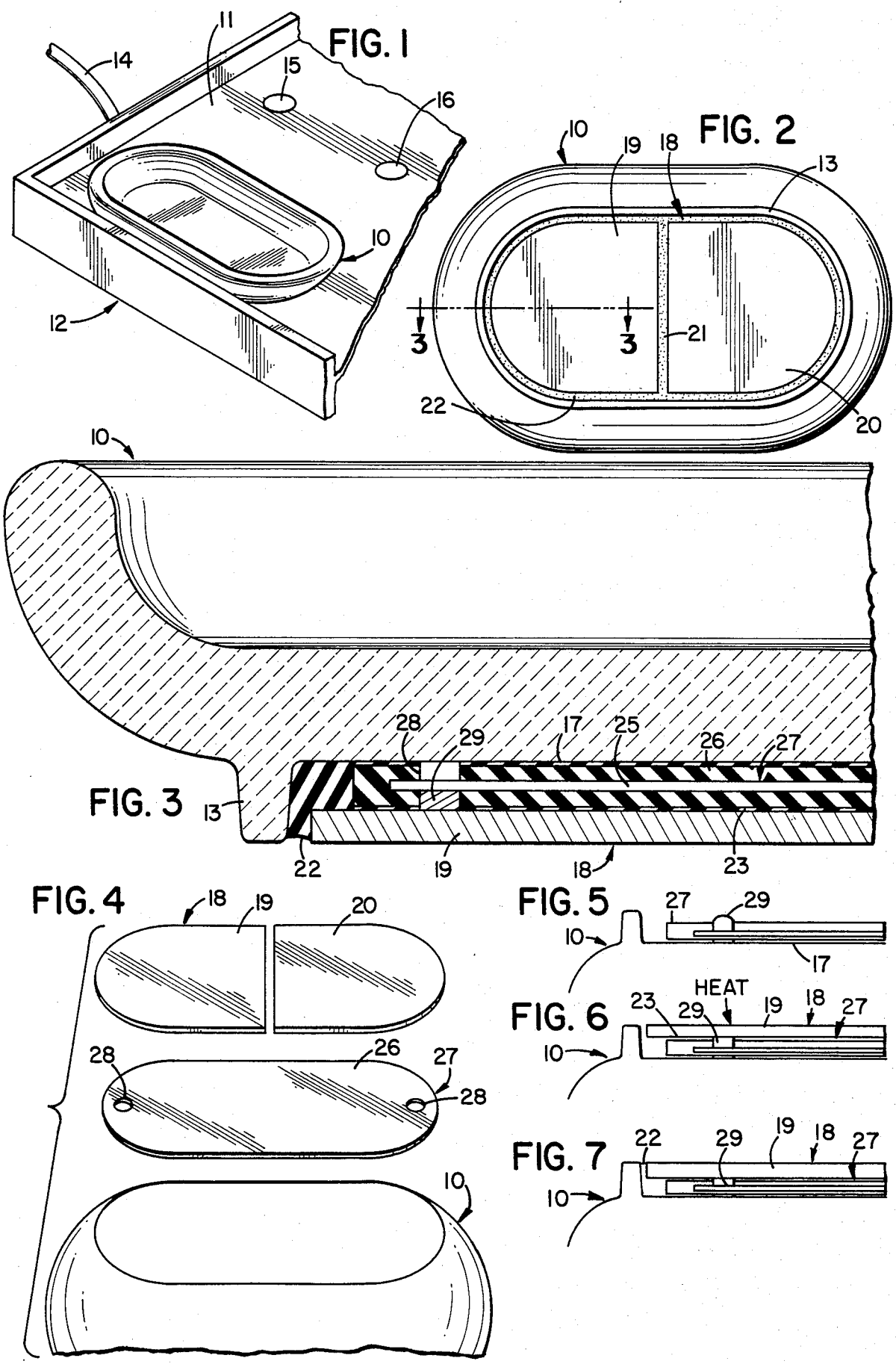

SERVING DISH WITH HEATING MEANS

INFORMATION DISCLOSURE STATEMENT

There is a considerable amount of institutional food service wherein a portion of food is placed on a serving dish, and the portion of food is then heated. Some variation of this arrangement is used in hospitals and other institutions as well as in commercial passenger airlines. On airlines, by way of example, the food is placed on the airplane in containers, and the flight attendants must place portions on dishes, place the dishes in the oven until the food is hot, remove the food from the oven, place the dish of food on a tray, and finally serve the tray to a passenger. This multiple handling of each portion of food takes a considerable amount of time and personnel to achieve the total food service.

There have previously been containers having heating means therein, but these containers have normally had either a plug for receiving an electrical cord, or have included small point-like electrical contacts for cooperation with similar, point-like contacts on a stand or receptacle.

SUMMARY OF THE INVENTION

This invention relates generally to containers with heating means, and is more particularly concerned with a serving dish having a self-contained heating means wherein the base of the dish comprises the electrical contact means, and to a method for assembling such a dish.

The present invention provides a serving dish of a ceramic or the like, a flat heating element disposed against the bottom of the dish, and a base plate covering the heating element and sealed with respect to the dish for encapsulating the heating element. The base plate is made of an electrically conductive material, and is divided into at least two pieces, each piece of the base plate being electrically connected to one terminal of the heating element. Thus, the dish has a broad base completely sealing the heating means and providing electrical contact means for energizing the heating means. As a result, a table, tray, or other generally flat surface can have two electrical contact points for receiving a dish in accordance with the present invention and energizing the heating element for heating the dish.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing a dish made in accordance with the present invention received on a tray or the like with provisions for energizing the heating means;

FIG. 2 is a bottom plan view of the dish shown in FIG. 1;

FIG. 3 is a much enlarged cross-sectional view taken substantially along the line 3—3 in FIG. 2;

FIG. 4 is an exploded perspective view showing the dish illustrated in FIGS. 1-3; and, FIGS. 5, 6 and 7 are rather schematic views illustrating the steps for assembling a dish in accordance with the method of the present invention.

DETAILED DESCRIPTION OF THE EMBODIMENT

Referring now more particularly to the drawings, and to that embodiment of the invention here presented by way of illustration, it will be seen in FIG. 1 that there is a conventional style of serving dish indicated at 10 received on a flat surface 11 of a tray designated at 12. There is a power cord 14 indicated for connecting the tray 12 to a source of electrical power. The surface 11 of the tray 12 includes at least two spots 15 and 16 that would be connected to electrical power. Those skilled in the art will readily understand that a single tray 12 may have only the two spots 15 and 16, or the tray 12 may have a plurality of pairs of spots such as the spots 15 and 16.

In the event the tray 12 is a serving tray for one individual, as is currently used by commercial airlines, the tray may have only the two spots 15 and 16 for receiving the serving dish 10 having the food to be heated. In this case, it will be understood that the dish to be heated would be placed in the one location to receive electrical power from the spots 15 and 16, and other dishes that are to remain cold would be placed elsewhere on the tray. It will also be understood by those skilled in the art that a plurality of electrical contact points could be placed around a tray so one would have a choice of locations for placing the dish to be heated. Dishes that are not to be heated would generally be of a ceramic or a plastic material, so there would be no hazard in placing such dishes over the electrical power points such as the spots 15 and 16.

It will also be recognized that, in the event a plurality of people will be served from one tray, a plurality of pairs of spots such as the spots 15 and 16 could be provided on the tray 12, and a separate dish such as the dish 10 placed appropriately over each pair of spots to heat all of the dishes. The various people would then be served from the single tray 12 with the individual dishes. It will readily be recognized that these are presented by way of suggestion, and those skilled in the art will devise numerous systems to be used in conjunction with the heated serving dish of the present invention.

Looking now at FIG. 2 of the drawing, it will be seen that the entire bottom of the dish 10 is covered by a bottom plate 18, the plate 18 being divided into two halves designated at 19 and 20. The bottom plate 18 is divided at the transverse strip of sealant indicated at 21; and, it will be seen that the sealant extends completely around the bottom plate 18 as is indicated at 22.

It is contemplated that the entire bottom plate 18 will be made of an electrically conductive material, such as a noncorrosive metal. A material such as stainless steel would be particularly desirable since the dish of the present invention is intended for commercial food service, though of course numerous other materials would work quite satisfactorily.

Looking at FIG. 3 of the drawings, the dish 10 is, in itself, a generally conventional ceramic dish of the type presently utilized by airlines and the like for individual food portions. The present invention contemplates the use of such dishes, the heating means being added thereto as shown.

It will be understood that there are also readily available heating means including an electrical resistance element designated at 25 laminated in heat conductive and electrically insulative material 26. The electrical resistance element 25 is connected at each end to a spot for connection of the resistance element to a source of power.

In the device shown in FIG. 3 of the drawings, it will be understood that the opening designated at 28 through the material 26 represents the contact point for the resistance element 25, and it will here be seen that the opening 28 is filled with solder designated at 29, the solder 29 being in electrical contact with the bottom plate 19.

Since the plate 19 is a solid metal plate or the like, by completely sealing around the plate 19, the electrical heating element will be completely encapsulated. This is accomplished by means of the sealant indicated at 22. It will be remembered from the discussion in connection with FIG. 2 of the drawings that the two half-plates 19 and 20 of the bottom plate 18 are entirely surrounded by the sealing material indicated at 21 and 22, resulting in a total encapsulation of the heating element.

In more detail, it will be observed in FIG. 3 of the drawings that the dish 10 will usually include a ridge 13. The heater 27 and the bottom plate 18 are placed into the center of this ridge 13 so the bottom plate 18 will normally not protrude beyond the ridge 13 to a great extent. The heater 27 is bonded to the bottom of the dish 10, preferably utilizing the same material as the sealant. FIG. 3 illustrates a thin layer 17 of sealant between the dish 10 and the heater 27; and, a thin layer of adhesive 23 also bonds the plate 18 to the heater 27. The encapsulation of the heater 27 is then completed by filling in between the ridge 13 and the plate 18 with the sealant indicated at 22.

Looking now at FIG. 4 of the drawings, the assembly of the dish is shown. The dish 10 is shown, showing the lower surface of the dish 10. The heater 27 is then shown spaced from the dish 10, and showing the electrical contact points 28 for the heater 27. The bottom plate 18 is then shown spaced from the heater 27, the bottom plate 18 being divided into the two half-plates 19 and 20.

Looking now at FIGS. 5, 6 and 7, the method of assembly of the dish of the present invention will be understood. FIG. 5 shows a schematic representation of the dish 10, with the heating element 27 bonded to the bottom surface of the dish 10 by adhesive 17. The opening 28 in the heating element 27 contains solder, and the solder 29 extends beyond the heating element 27 as is indicated in FIG. 5.

Looking at FIG. 6, then, the bottom plate 18 is bonded to the heating element 27 by adhesive 23; and, heat is applied to the bottom plate 18. The bottom plate 18 is heated to a temperature above the melting temperature of the solder, so the solder 29 is melted, and adheres to the bottom plate 18. It will therefore be understood that a good electrical contact is provided between the bottom plate 18 and the solder 29, hence to the heating element 27.

Finally, looking at FIG. 7 of the drawings, it will be seen that the bottom plate 18 has received the sealant 22 at the edge thereof. While many sealants may be discovered, it will be understood that a silicone rubber sealant is admirably adapted to use as the sealant and adhesive designated at 17, 21, 22 and 23 since the silicone rubber adheres quite well to both the ceramic and the metal, and can withstand the temperatures involved. Also, it will be seen that the sealant is such that the resulting dish can be washed in conventional dishwashers, and is otherwise immersable.

It will therefore be understood that the dish of the present invention provides a versatile dish having a self-contained heating element with a bottom plate usable as the electrical contacts for energizing the heating element. The bottom plate is completely sealed with respect to the serving dish so the heating element is encapsulated and the dish is immersable without danger of damaging the heating element. The method of the present invention provides a very simple process for assembling the heated dish, and for assuring that the heating element is electrically connected to the bottom plate.

Those skilled in the art will understand that, if the two electrical power spots such as the spots 15 and 16 are both contacted by one portion of the bottom plate 18 such as the portion 19 or 20, there will be a short circuit; therefore, the spots 15 and 16 should be spaced apart a distance greater than the largest dimension of one of the plate portions 19 or 20.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. A serving dish with heating means, said serving dish including a ceramic dish having a bottom, and a ridge surrounding said bottom, an electric heating element comprising an electric resistance element, electrically insulative material substantially covering said electric resistance element, said electrically insulative material defining holes therein for positioning electrical contact points for said electric resistance element, said electric heating element being disposed substantially against said bottom of said ceramic dish and generally coextensive therewith, a bottom plate substantially covering said heating element, said bottom plate comprising a pair of electrically conductive half-plates, said pair of half-plates being electrically separated from each other, each half-plate of said pair of half-plates being electrically connected to one contact point of said electrical contact points for said electric resistance element, adhesive means fixing said heating element to said bottom and for fixing said bottom plate to said heating element, and sealing means surrounding both said half-plates for sealing said bottom plate with respect to said serving dish for encapsulating said heating element.

2. A serving dish as claimed in claim 1, said sealing means extending from the edge of said bottom plate to said ridge, the arrangement being such that said heating element and said bottom plate are substantially received within the confines of said ridge.

3. A serving dish as claimed in claim 1, said bottom plate consisting of stainless steel, and further including a first quantity of solder connecting one half-plate to one electrical contact point, and a second quantity of solder connecting the other half-plate to the other electrical contact point.

* * * * *